Dec. 2, 1969  L. L. SEIDEL  3,481,378
CUTTING APPARATUS

Filed Dec. 14, 1967  3 Sheets-Sheet 1

INVENTOR
LUTHER L. SEIDEL
BY *Richard O. Church*
ATTORNEY

Dec. 2, 1969 L. L. SEIDEL 3,481,378
CUTTING APPARATUS

Filed Dec. 14, 1967 3 Sheets-Sheet 2

INVENTOR
LUTHER L. SEIDEL
BY
ATTORNEY

United States Patent Office 3,481,378
Patented Dec. 2, 1969

3,481,378
CUTTING APPARATUS
Luther L. Seidel, 400 Muhlenberg at 5th Street Hwy.,
Reading, Pa. 19605
Filed Dec. 14, 1967, Ser. No. 690,509
Int. Cl. A01d 23/04; B26d 1/46
U.S. Cl. 146—81                      7 Claims

ABSTRACT OF THE DISCLOSURE

A cutting apparatus includes a pair of traveling cutters mounted for movement in endless paths. The cutters have individual cutting teeth spaced in side-by-side relationship around the periphery of the cutter that extend in transverse planes. Each cutter carries the teeth from a position in which the teeth on one cutter are spaced away from the teeth of the other cutter in a gradually converging path to a severing position in which the teeth of the two cutters are positioned in article-severing relationship to each other. Articles to be cut, e.g., mushrooms or like articles having caps mounted on comparatively thin stems, are placed between the cutters with the caps resting on the horizontal top surfaces of the cutter teeth so that the teeth carry the articles to a position a which the teeth are in article-severing relationship to each other, thereby cutting the article and delivering the cap and stem portions to separate receiving receptacles.

---

This invention relates to a novel cutting method and apparatus and is particularly directed to cutter mechanisms for rapidly cutting small-headed articles of varying size.

Although not limited thereto, the invention is particularly directed and unique suited for the purpose of separating mushroom caps from their stems, and will be described as such in the following description. According to prior art techniques, this necessary step in the processing of mushrooms has been accomplished either manually or by the use of various devices which remove the stems from a plurality of mushrooms simultaneously. In either case, considerable manual dexterity and skill is required on the part of workmen employed for this purpose.

The present invention is directed to an improved form of cutting apparatus which separates the mushroom stems from their caps at a far greater rate than has heretofore been possible. In actual practice, the use of the invention has resulted in increased production rates of up to ten times the highest known production rates possible when known prior techniques are employed.

An important object of the invention, therefore, is the provision of cutting apparatus which facilitates the processing of mushrooms by effecting rapid removal of mushroom stems from caps or buttons.

Further objects of the invention involve the provision of apparatus for effecting removal of mushroom caps from stems without tearing or damaging the caps and which accomplishes the operation without regard to variations in the diameter of the mushroom stem or the mushroom cap.

Another object of the invention is the provision of apparatus of the kind described which is extremely reliable in operation and incorporates safety features which eliminate the possibility of injury to the operator.

A still further object of the invention is the provision of apparatus which is extremely dependable in operation and low in maintenance costs.

The foregoing and various other objects of the invention are achieved by a pair of traveling cutters, each having a plurality of individual cutting teeth spaced in side-by-side relationship and extending transversely of the cutters. Each of said cutters travels in endless paths and carries the teeth from positions in which the teeth on one cutter are spaced away from the teeth on the other cutter to a severing position in which the teeth on the two cutters are adjacent one another. At positions intermediate the two stations, the spacing of the teeth on the one cutter relative to the other becomes progressively smaller, whereby mushrooms of various size may be inserted between the cutters with the caps resting on the horizontal top surfaces of the teeth and with the stems extending downwardly between the teeth.

The various aspects of the invention will be fully understood upon reference to the following detailed description of an illustrative embodiment of the invention and from the accompanying drawings in which.

Figure 1:
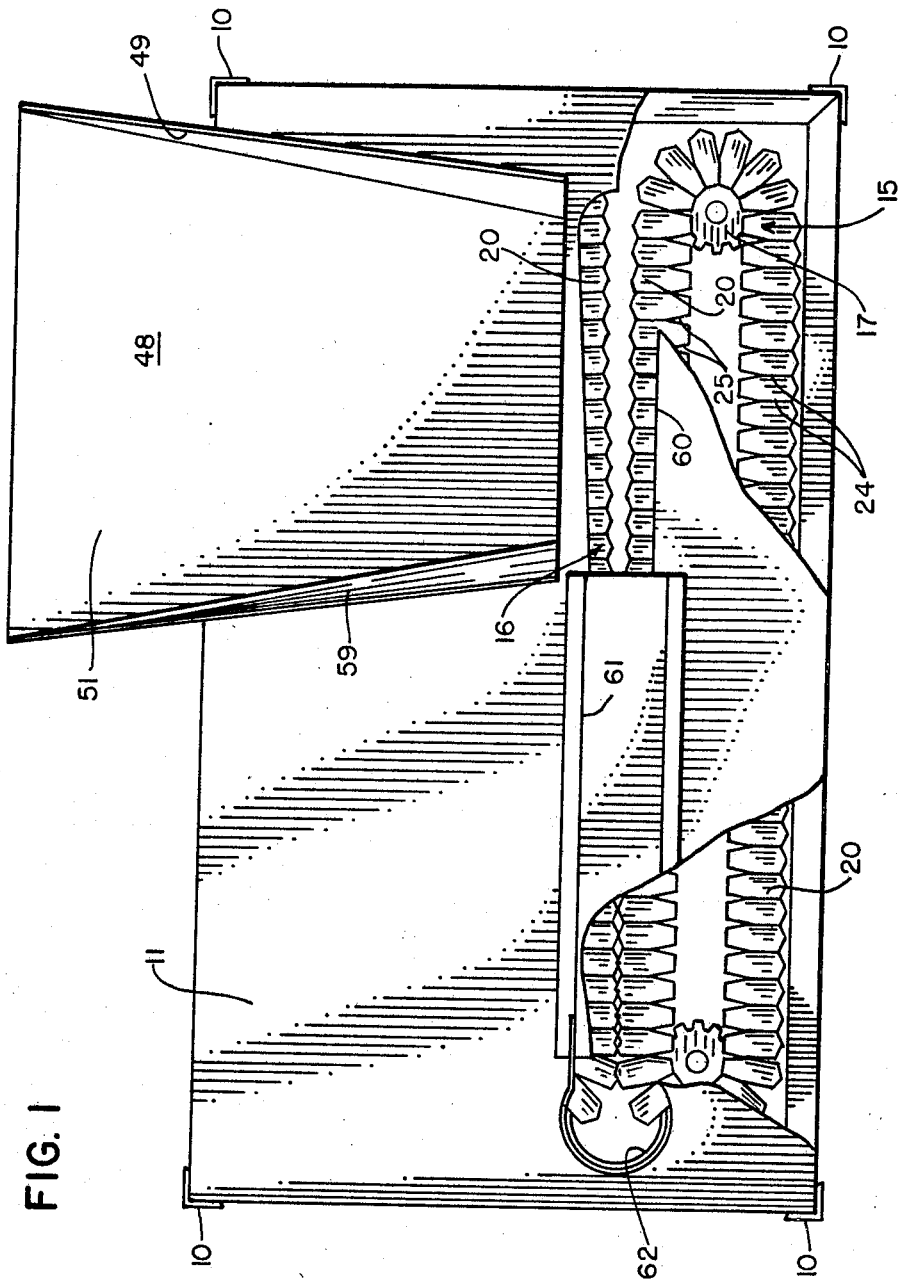
FIGURE 1 is a plan view of a cutting apparatus incorporating the principles of this invention with portions of the outer covering being broken away for purposes of illustration.
Figure 2:
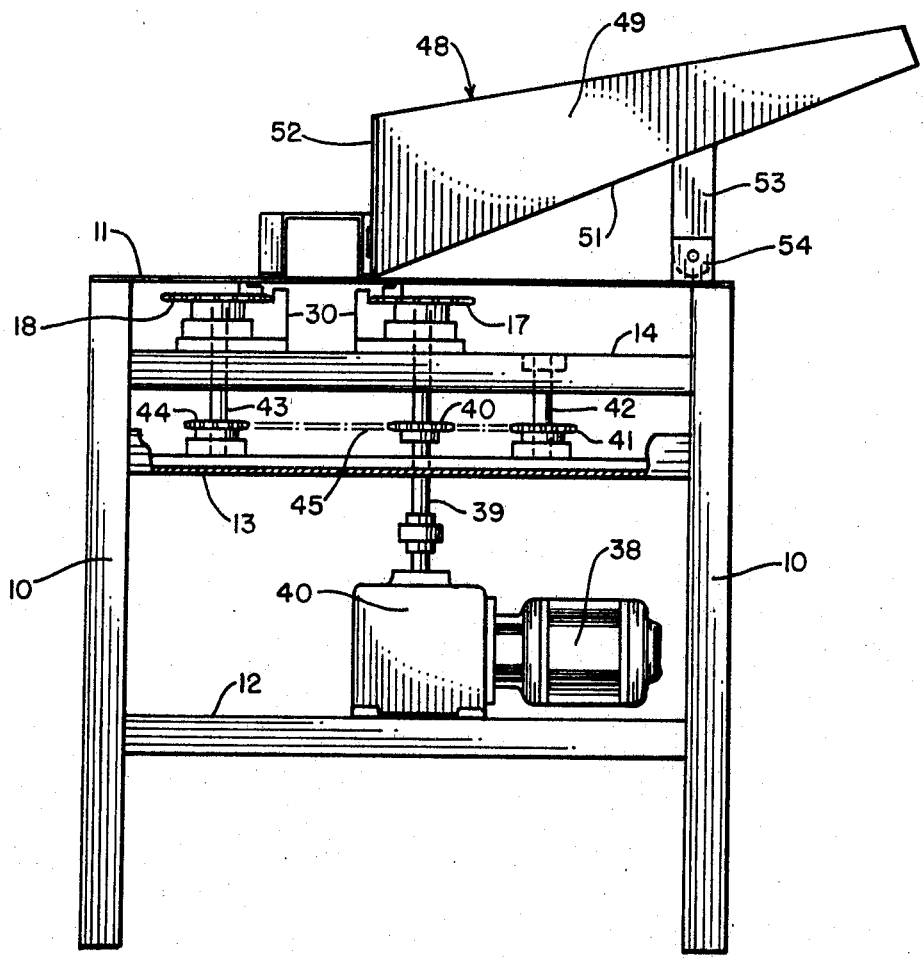
FIGURE 2 is an elevational view of one end of the apparatus shown in FIGURE 1.

Attention is first directed to FIGURES 1 and 2 wherein the illustrative form of mechanism is mounted on a table having legs 10 and a top 11, typically formed of stainless steel. Also provided are supports 12, 13 and 14 for supporting various portions of the structure, as will be described later.

Traveling cutters 15 and 16 are mounted just underneath the table top 11 in side-by-side relationship. Although the cutters could assume various forms, they are preferably comprised of endless pivotal link-type chains which are mounted on pairs of sprocket wheels, two of which are shown in FIGURE 2, one sprocket wheel 17 being shown for the chain 15 and a sprocket wheel 18 being shown for the chain 16 in that figure. The sprocket wheels 17 and 18 are the drive sprockets for their respective chains, as will appear presently.

Figure 4:
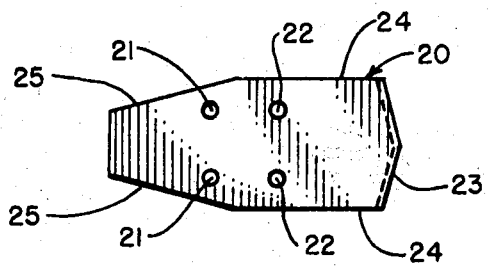
FIGURE 4 is a detailed view showing a preferred form of cutting tooth.
Figure 5:
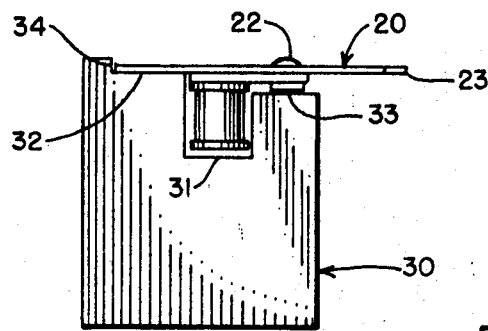
FIGURE 5 is a detailed view showing the tooth of the FIGURE 4 structure in elevation, together with certain support structure.

The chains 15 and 16 each carry generally transversely extending cutting teeth 20. A preferred form of tooth is shown in FIGURES 4 and 5 on an enlarged scale with respect to FIGURE 1. The teeth are adapted to be secured to the chain links by means of pins 22. Holes 21 are drilled in the teeth to accommodate the pin linkages of the chain element. Preferably, the cutting edges of the teeth are beveled somewhat, as is shown at 23.

As can be seen most clearly in FIGURE 1, the teeth 20 extend entirely around the periphery of each of the chains, the teeth being mounted so that the side edges 24 of one tooth abut the side edges of the next adjacent tooth. In order to prevent interference between adjacent teeth as they move through the curved portions of their respective endless paths, the rear edges of each tooth are also beveled or cut away, as can be seen at 25 in FIGURES 1 and 4. It will be understood that when the teeth are moving through straight portions of their endless paths, the beveled sections 25 are separated and move together until they are in substantial engagement with one another in the curved sections of the paths.

According to the invention, and as can be seen from FIGURE 1, the cutters are mounted with respect to one another so that the teeth move through positions at which they face each other but are spaced apart and gradually converge as they approach a severing or cutting station or position. At positions spaced relatively far away from the severing position, the teeth are far enough apart so as to allow for clearance for the stem of the large-sized mushroom being severed, and the distance between gradually closes until the severing station is reached.

The mushrooms or other articles to be severed are placed between the teeth at positions where the teeth are relatively far enough apart but where the top surfaces of the teeth support or carry the mushroom caps. The top surfaces of the teeth, therefore, can be considered to function as carrier means for carrying the mushrooms to the severing station.

Preferably, when the teeth are at the severing station, their tips or points overlap each other slightly as can be seen in FIGURE 1, with the cutting edges of the teeth on one cutter being in engagement with the cutting edges of the teeth on the other cutter. Although cutting can in some instances be accomplished without such overlapping, I have found that the overlapping of the teeth produces excellent results in that clean separation of the stems from the caps of even the smallest mushrooms is accomplished.

Preferably, means are provided to support the teeth on each cutter during that portion of their path between the loading positions and the severing station. For this purpose, grooved guide bars 30 are secured in spaced apart side-by-side relationship. This arrangement of the guide bars can best be understood upon reference to FIGURE 5 wherein one of the bars is shown in section. As will be understood from that figure, each guide bar is provided with a relatively deep groove 31 within which the chain links of the cutter ride. The teeth 20 are each supported on a flat surface 32 on one side of the groove 31 and a second flat surface 33 on which the bottom of each fastener 22 rides. The surfaces are finished so as to provide minimum frictional resistance with the under surfaces of the teeth as the teeth move towards the severing station. To minimize friction, the surface 33 may be covered or coated with Teflon, nylon, or like material.

Preferably, the guide bars 30 are also provided with an upstanding backing wall 34 which prevents excessive lateral or sidewise movement of the teeth.

Figure 3:
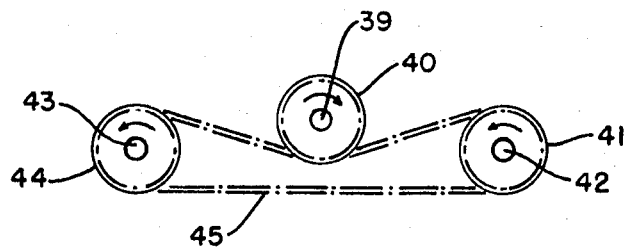
FIGURE 3 is a schematic view illustrating the drive mechanism of FIGURE 2.

The traveling cutters are driven by a drive arrangement comprising an electric motor 38 mounted on the support 12 as shown in FIGURE 2. The motor drives a shaft 39 via gear unit 40. Shaft 39 has a sprocket 17 keyed thereto for rotation therewith. Sprocket 17 and sprocket wheel 40 are secured to the shaft 39 for rotation therewith. As can be seen in FIGURES 2 and 3, an idler sprocket 41 is mounted on a shaft 42 adjacent the shaft 39. The sprocket wheel 18 is keyed to a shaft 43 on which a sprocket wheel 44 is also keyed. A flexible drive chain 45 meshes with the teeth on sprocket wheels 40, 41 and 44 in the manner shown in FIGURE 3. Rotation of the shaft 39 in the direction indicated by the arrow in FIGURE 3 causes shaft 43 to rotate in the direction indicated by the arrow, and, as a result, sprocket wheels 17 and 18 are caused to rotate in the same direction as the shafts associated with those wheels. Thus, the traveling cutters are caused to move in the same direction as the sprocket wheels 17 and 18, that is, from a position in which the teeth on the two cutters are relatively separated towards the position in which the cutting or severing operation takes place.

A hopper 48, shown in FIGURES 1 and 2, is mounted on top of the table 11. Hopper 48 is comprised of side walls 49 and 50, an inclined floor 51, and an end wall 52. The hopper is mounted on brackets, one of which is shown in 53 in FIGURE 2. The brackets 53 are mounted for pivotal movement on brackets 54 which are, in turn, secured to the table. The arrangement provides for movement of the hopper 48 from the position shown in FIIGURE 2 in a clockwise direction to a position in which the floor 51 inclines downwardly to the right as the hopper is viewed in FIGURE 2.

The sheet metal table top 11 is provided with an elongated cut-out or slot 60 which exposes the teeth 20. Preferably, a guard, comprised of an inverted channel member 61, covers the teeth in the region where the teeth come close together so that the operator's fingers cannot be caught between the cutters. As can be seen in FIGURE 1, the guard leaves exposed only those parts of the cutter paths at which the teeth are separated far enough apart to receive the stem of a mushroom.

Immediately following the position or station at which the cutters interfit or overlap, the teeth again separate as they move around the circumference of their associated sprocket wheels. At this point, sides of the teeth move out from under the separated cap of the mushroom. As the cap drops, it falls through the guide opening 62 which leads to a suitable receptacle provided for the purpose of collecting the mushroom caps.

In operation, the hopper 48 is filled with mushrooms and the operator selects the mushrooms one at a time without regard to size and places the stems between the teeth of the traveling cutters with the underside of the caps resting on the upper surface of the teeth. The operator need give little concern to the size of the mushroom since the gradually converging paths of the teeth on the two cutters makes it possible to place the mushroom at any point where a stem of a given thickness can be accommodated. In most cases, the operator initially places the mushroom stem between the teeth at the upper limit of the slot 60 as the slot is viewed in FIGURE 1, and may move it downwardly towards the severing station until the operator is sure that it will be supported by the sides of the teeth. If the mushrooms are comparatively small, it will be understood that they will be positioned at a point where the teeth have moved closer together so that they can support the caps. By this arrangement, a wide variety of sizes of mushrooms can be accommodated. Since the teeth are moving in gradually converging paths, the mushrooms are carried towards the severing station and as they move together, the teeth effect clean cutting and separation of the stem from the cap.

As the stems are separated from the caps, the stems drop to a suitable receptacle underneath the table and the caps are carried by the teeth to a point at which the teeth again separate, at which point the caps drop down to the opening 62.

When the hopper 48 is emptied of mushrooms of the kind suitable for marketing, the operator tilts the hopper in a clockwise direction, as the hopper is viewed in FIGURE 2, in order to empty out mushroom fragments or other waste material. The hopper is thereupon returned to the position shown in the drawing and refilled.

It has been found that with the apparatus just described, substantially economies in the processing of mushrooms for market can be achieved. Relatively unskilled operators can operate the cutting mechanism and can achieve fast production rates in short order. Little concern need be given classifying and sorting the mushrooms as to size.

It will be understood that multiple units of the cutting mechanism described herein can be cooperatively arranged. For example, two cutters can be positioned "head-to-head" in a manner that a single hopper can service both machines.

Although certain embodiments of this invention have been shown in the drawings and described in the specification, it is to be understood that the invention is not limited thereto, is capable of modification, and can be rearranged without departing from the spirit and scope of the invention.

I claim:

1. Apparatus for severing mushroom caps from stems comprising a pair of traveling cutters, each having a plurality of individual cutting teeth spaced in side-by-side relationship and extending transversely of the cutters, each of said cutters traveling in endless paths and carrying said teeth from a first station in which the teeth are spaced away from the teeth on the other cutter to a second severing station in which the teeth on the two cutters are substantially in stem-severing engagement with one another, the spacing of the teeth on one cutter relative to the other at points intermediate the two stations becoming progressively smaller, whereby the caps of mushrooms of varying sizes are carried to said severing station while positioned on the horizontal top surfaces of said teeth, with the stems downwardly extending between the teeth.

2. Apparatus according to claim 1, wherein said cutters comprise endless pivotal link-type chains with the teeth being mounted on said chains.

3. Apparatus according to claim 1, wherein the teeth on one cutter are in overlapping relationship with the teeth on the other cutter when at said severing station.

4. Apparatus for cutting mushrooms or like articles comprising a pair of traveling cutters, each having a plurality of individual cutting teeth spaced around the periphery of the cutter in side-by-side relationship and extending in substantially horizontal planes, said cutters including means to move the teeth in gradually converging paths from spaced-apart positions which allow for the positioning of mushrooms stems between the teeth with the caps being supported by the upper horizontal surfaces of the teeth to stem-severing positions in which the teeth are in an overlapping relationship, and for thereafter moving said teeth out of cap-supporting position.

5. Apparatus according to claim 4, wherein said cutters comprise endless pivotal link-type drive means with the teeth being mounted on said pivotal links.

6. Apparatus according to claim 5, further including guide members for guiding the cutters in the converging portions of the paths, said guide members having grooves, within which the links are adapted to ride, and upstanding rails adjacent said teeth on the side away from the cutting edge thereof for preventing lateral movement of said teeth.

7. Apparatus according to claim 5, wherein sides of said teeth are substantially in engagement with each other during the portions of the paths in which the mushrooms are adapted to be carried by the teeth, and further wherein said side edges are cut away to permit relative turning movement in the curved portions of the paths.

References Cited

UNITED STATES PATENTS 3,192,975 7/1965 Noel _____ 146—72
3,192,976 7/1965 Clock _____ 146—72 X ANDREW R. JUHASZ, Primary Examiner U.S. Cl. X.R.

146—129